April 19, 1932.  R. R. WILEY  1,854,357
ELECTROLUMINESCENT TUBE
Filed Jan. 30, 1928
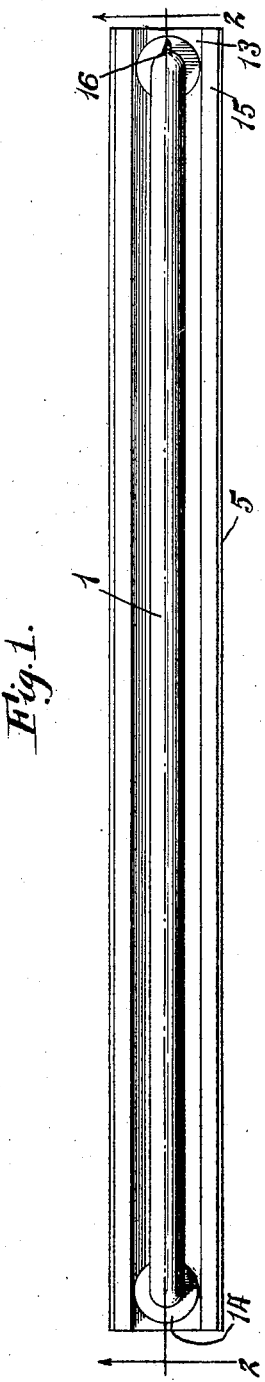
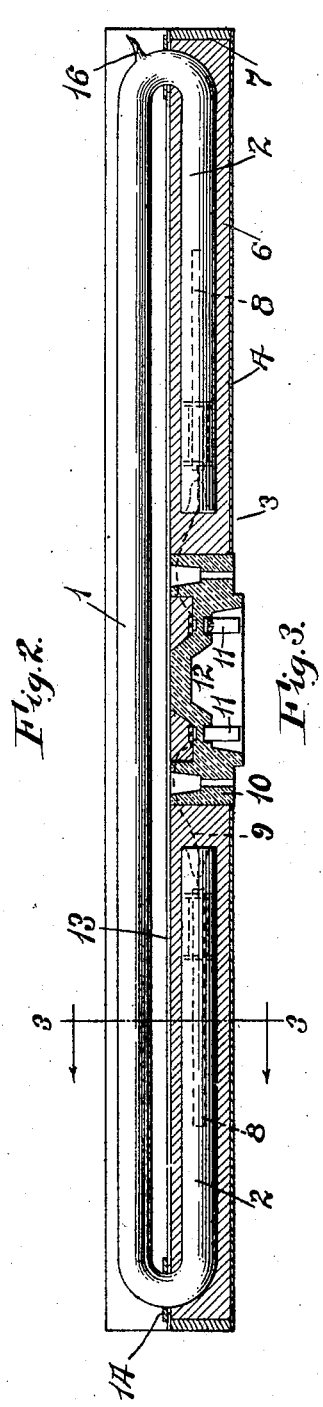
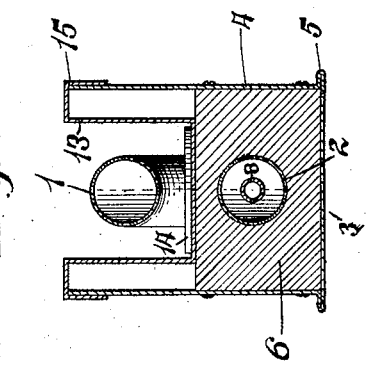
Inventor
Roy R. Wiley
By
Popp and Powers,
Attorney Patented Apr. 19, 1932

1,854,357

UNITED STATES PATENT OFFICE

ROY R. WILEY, OF BUFFALO, NEW YORK

ELECTROLUMINESCENT TUBE

Application filed January 30, 1928. Serial No. 250,439.

This invention relates to electroluminescent tubes applicable for purposes of illumination or display and especially intended for, although not necessarily limited to, use in electric signs, and, more particularly, the invention pertains to a novel form of mounting for the tube.

An object of the invention is to provide a mounting by which the tube is firmly supported and wherein the tube and mounting form a complete and compact unit which may be readily shipped to remote points without danger of breakage and quickly attached to or removed from a sign.

Another object is to provide a mounting which will keep the electrode-carrying portions of the tube warm and protect the terminal connections from the elements.

A further object is to provide a unit in which is incorporated a reflecting surface cooperating with the display portion of the tube whereby the light rays may be concentrated or spread out as desired.

A further object is to provide a unit in which the relation between the tube and the reflecting surface is such that when a series of the units are arranged conterminously, an effect of continuity of the luminescent display is achieved with the result that the effect on the eye of a series of relatively short tubes is practically the same as that of a single tube corresponding in length to the aggregate lengths of the short tubes.

A further object is to provide a unit which may be readily serviced when the tube is exhausted.

An embodiment of the invention is illustrated in the accompanying drawings, wherein:

Figure 1 is a top plan view of a unit constructed in accordance with the invention.

Figure 2 is a sectional view along line 2—2 of Fig. 1.

Figure 3 is a sectional view along line 3—3 of Fig. 2.

In carrying out the invention, I utilize a tube as 1, the end or electrode-carrying portions 2 of which are turned preferably through an angle of 180 degrees so as to extend in a plane substantially parallel to the display portion of the tube. The provision of end portions under-turned in this manner permits the overall length of the tube to be materially increased without increasing the display length and thereby secures the advantage of a materially increased tube life while at the same time maintaining a relatively compact tube. Another advantage is that such end portions may be utilized as anchorage arms and thus facilitate the securing of the tube to a mounting such as 3.

The mounting 3 includes a casing 4 preferably composed of sheet metal and, in the construction shown, formed to delimit a channel, the length of the casing, and hence of the channel also, being slightly greater than the length of the display portion of the tube. The casing is formed with flanges as 5, which provide a means of securing the casing to a supporting surface as by screws or other suitable fastening means, said flanges extending outwardly from the walls of the casing preferably adjacent the base thereof. The casing is herein shown as straight but it may be of such other outline as may be practicable or desirable.

The tube is positioned longitudinally in the channel with its electrode-carrying portions placed adjacent the bed thereof, the position preferably being such that the display portion of the tube does not extend into the plane constituted by the outer edges of the casing walls. By so positioning the tube, it is substantially enclosed within the casing inasmuch as no part of it extends beyond the limits of the casing walls. In this manner, the packing of the unit is facilitated and the tube protected against breakage either by hail or wind storms when in use or by rough or careless handling otherwise. The tube is firmly held in this position by the cooperation of its end portions with a material 6 which partly fills the channel and in which said end portions are embedded. This material is preferably electrical and heat insulating and may be a hard-setting plastic material which adheres to the walls of the casing or a compacted granular material which is otherwise firmly confined in the casing, a sufficient quantity being used to completely surround the end portions 2 while at the same time to leave a space between the filling and the display portion.

While any suitable filling may be utilized, a substance such as wax is preferred because the ease with which it can be melted, poured into the casing and hardened, facilitates the manufacture of the unit. Furthermore, the wax provides an easy method of securing a firm support for the tube without the use of other mechanical parts and a support which will be effective at all temperatures likely to be encountered in use. A further advantage arises from the facts that the coating of metal formed on the walls of the end portions 2 by the vaporization of the electrodes absorbs the gas in the tube at a rate which is inversely proportional to the temperature of the coating, and if the end portions be kept warm, the rate of gas absorption is effectively and correspondingly decreased. I have found that wax because of its heat insulating property will keep the end portions desirably warm and therefore the use of wax in this manner will increase the life of a tube and in the case of tubes of smaller sizes, it effects a very substantial increase of life.

To facilitate the pouring of the wax or similar material into the casing, the ends of the casing may be closed in any suitable manner but preferably by the use of fiber pieces as 7, which are held in place by screws or the like extending through the casing walls. In order to reduce the weight of the unit, wax may be utilized only around the end portions of the tube and a lighter insulation such as cork, fabric, etc., placed in the intermediate portion of the casing. It will, of course, be understood that wax is merely, as now considered, a preferred substance and that other suitable substances may be employed.

The electrodes 8 of the unit are provided with terminal wires 9, which are suitably sealed in the end wall of the tube and connected to a connecter receptacle 10 which is also anchored in the filling 6. The receptacle may be of any suitable form and is provided with line terminals 11 extending through the walls of the receptacle into a socket or plug receiving chamber 12 formed by the receptacle.

A reflecting surface is preferably provided adjacent the display portion of the tube. While this surface may be formed so as to spread out or concentrate the light rays of the tube as desired, I prefer a surface provided by a channel as shown. This surface preferably is formed by the use of a pair of cooperating sheet metal angle strips 13 which are placed over the filling 6 in opposed relation so as to extend around opposite sides of the tube the angle strips abutting each other directly below the display portion of the tube. The angle strips 13 extend slightly beyond the ends of the display portion of the tube and terminate at the ends of the casing. These strips are recessed along their abutting edges to provide openings for the accommodation of the goose neck turns of the tube and further to prevent contact of the metal with the tube. The exposed surfaces of the angle strips are enameled to provide an efficient reflecting surface and the recessed portions are covered with enameled insulating washers 14 so as to preserve the continuity of this surface. In order to hold the angle strips securely in the position described, they are formed with flanges as 15 which are shaped to fit tightly over the outer longitudinal edges of the walls of the casing.

By terminating both the casing and the reflecting surface at a point slightly beyond the ends of the display portion of the tube, the reflecting surfaces of adjacent units will abut when a series of units are placed conterminously, and thereby give, the effect of a continuous reflecting surface extending from one end to the other of the series. When the units are energized, the reflecting surface between the ends of adjacent units functions, by reflection, to merge the light of the adjacent tubes thereby giving the effect of one long tube instead of a number of short tubes.

Ordinarily when a tube is exhausted, it is removed from the sign and discarded because of the difficulty of servicing the unit at the point of use or transporting the unit to and from a servicing station. The ease of packing and transporting the present unit, however, permits an exhausted tube unit to be removed and shipped to the servicing station and there refilled with gas. To this end and to permit the tube to be refilled without necessitating the disassembly of the unit, a filling teat 16 is formed on a gooseneck turn of the tube, the teat being so located as to be readily assessible for connection and filling purposes while at the same time not marring the outward appearance of the tube.

From the foregoing, it will be readily apparent that the simplicity of the design and the ease of manufacture enables the unit to be produced at low cost; that the firm support accorded the tube and the rugged construction of the unit throughout enables it to be easily packed and readily shipped to remote points without danger of breakage; and that the shape of the unit permits the use of simple securing means for its attachment to a support. Furthermore by making the units in standard sizes, the construction makes its possible for a sign owner to keep a spare unit on hand at relatively low cost, whereby when any replacement is necessary, it may be effected immediately without awaiting the arrival of a new unit and therefore without entailing any substantial interruption in the use of the sign.

Having described my invention, I claim:

1. A display unit comprising in combination an electroluminscent tube having its end portions turned so as to extend toward each other, a casing of channel form, an insulating filling in the channel of said casing, said tube being arranged in said channel with its end portions embedded in said filling, and a receptacle fitted in said casing below the display portion of said tube and electrically connected to the end portions of said tube said receptacle having means for connecting said tube to power.

2. A display unit comprising in combination an electroluminescent tube having offset end portions, a casing of channel form, insulating filling in the channel of said casing, said tube having its display portion arranged over said filling and its end portions embedded in said filling and a connecter receptacle fitted in said casing below the display portion of said tube and electrically connected to the end portions of said tube, said receptacle being embedded in said filling and having means for connecting said tube to power.

3. A display unit comprising a casing adapted for attachment to a stable support, a luminescent tube extending through and conforming in outline to said casing and having offset end portions provided with electrodes, a compact body of material confined within said casing and in which said end portions are anchored and a receptacle confined within said casing under the display portion of said tube and connected to said end portions, said receptacle being embedded in said body of material and having means for connecting said tube to power.

In testimony whereof I affix my signature.

ROY R. WILEY.